United States Patent [19]

Genda

[11] Patent Number: 5,126,958
[45] Date of Patent: Jun. 30, 1992

[54] CALCULATOR EQUIPPED WITH NOTATION CONVERTING FUNCTION

[75] Inventor: Kouhei Genda, Fussa, Japan

[73] Assignee: Casio Computer Co., Ltd., Tokyo, Japan

[21] Appl. No.: 362,940

[22] Filed: Jun. 8, 1989

[30] Foreign Application Priority Data

Jun. 20, 1988 [JP] Japan .............................. 63-80611[U]

[51] Int. Cl.$^5$ .............................................. G06F 3/00
[52] U.S. Cl. .............................................. 364/710.11
[58] Field of Search .................. 364/710.01, 710.10, 364/710.11, 900 MS File; 340/752, 756, 765, 792

[56] References Cited

U.S. PATENT DOCUMENTS 3,981,000  9/1976  Sado et al. ................ 364/710.11
4,001,569  1/1977  Dickinson ................. 364/715.05
4,205,516  6/1980  Terao ........................... 340/765
4,298,865  11/1981  Masuzawa et al. ....... 364/710.07

OTHER PUBLICATIONS

Greenfield et al., "Using Microprocessors and Microcomputers The 6800 Family", 1981, published by John Wiley & Sons, Inc., pp. 340-341.

Primary Examiner—Long T. Nguyen
Attorney, Agent, or Firm—Frishauf, Holtz, Goodman & Woodward

[57] ABSTRACT

Binary notation data which have been stored in a memory of an electronic calculator are displayed in such a way that only the binary notation data having bit numbers smaller than the maximum display digits of the calculator are read from the memory. In this case, at the same time, another indication is made that which portion of the entire binary data stored in the memory is displayed.

8 Claims, 5 Drawing Sheets

FIG. 2A

HEX  7 F 5 1 A

7 F 5 1 A
HEX

FIG. 2B

BIN  ☐ ☐ ☐ ■ 0 0 0 1 1 0 1 0
BIN

FIG. 2C

← ☐ ☐ ■ ☐ 1 1 1 1 0 1 0 1
BIN

CALCULATOR EQUIPPED WITH NOTATION CONVERTING FUNCTION

BACKGROUND OF THE INVENTION

1. Field of the Invention

The present invention generally relates to a calculator capable of displaying a notation converting result. More specifically, the invention is directed to a compact calculator capable of displaying a binary notation.

2. Description of the Prior Art

Recently, there is a great tendency that a compact calculator, for instance, an electronic pocket calculator owns a multi function. That is, there has been proposed such a calculator that various notation conversions between a decimal notation, a binary notation, an octal notation and a sexidecimal (hexadecimal) notation are carried out.

Since a strong demand is made in a size of such a compact calculator equipped with a notation converting function, an allowable display spacing of a display unit thereof is restricted. As a consequence, in displaying data such as binary numerical data, a length of the binary numerical data to be displayed becomes long. Under such conditions, as all of the binary numerical data cannot be simultaneously displayed on the display unit of a compact calculator, the entire binary numerical data is subdivided into a plurality of blocks, e.g., 8-bit blocks. When, for instance, keys "Block", "2", and "EXE" are operated on the calculator, a portion (8 bits) of the entire binary numerical data corresponding to this block 2 is displayed on the display unit thereof.

However, the lengthy numerical data is displayed in such a subdivision display mode, it is rather difficult to confirm that the displayed numerical data (8 bits) really corresponds to a portion of the entire numerical data. In other words, there is a drawback that an operator can hardly grasp the contents of the displayed numerical data with respect to the entire numerical data.

SUMMARY OF THE INVENTION

The present invention has been made in an attempt to solve the above-described problem of the conventional compact calculator, and therefore has an object to provide a compact calculator capable of displaying such a subdivided binary notation data, which can be readily grasped by an operator in a relationship with the entire binary data.

An electronic calculator, according to the present invention, comprises;

means for storing binary notation data therein;

data reading means for reading out a portion of said binary notation data from said storing means;

display means having a displaying member constructed of a plurality digits, capable of displaying the binary notation data read by said data reading means; and, indicating means for indicating which portion of said binary notation data stored in said storing means is displayed.

BRIEF DESCRIPTION OF THE DRAWINGS

For a better understanding of the present invention, reference is made to the following descriptions in conjunction with the accompanying drawings, in which:

FIGS. 2A to 2C represent various display conditions of the display units while the notation conversions and key operations are carried out;

DETAILED DESCRIPTION OF THE PREFERRED EMBODIMENTS

Arrangement of Electronic Calculator

Figure 1:
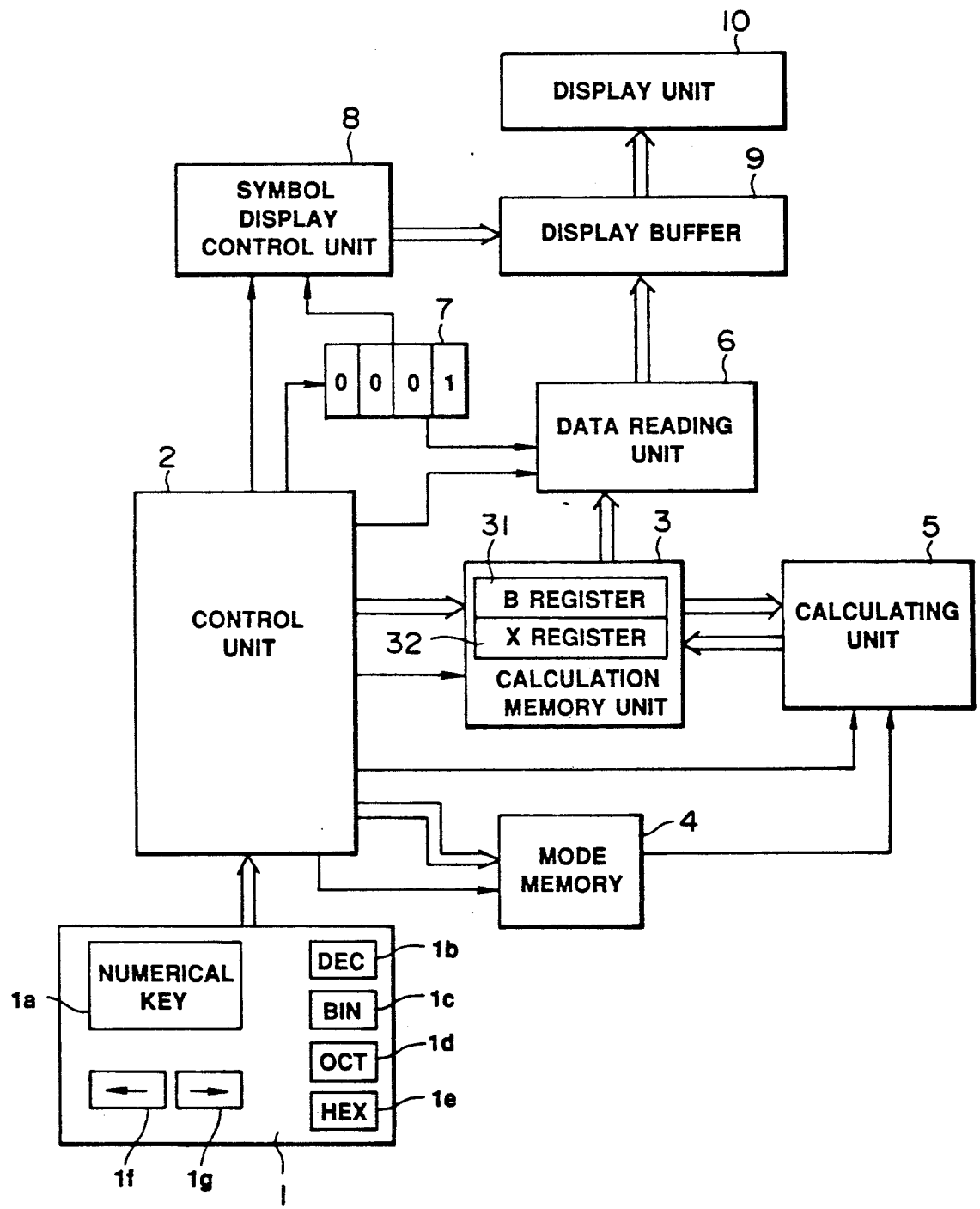
FIG. 1 is a schematic block diagram of an electronic calculator according to a preferred embodiment of the invention.

In FIG. 1, there is shown a circuit arrangement of an electronic calculator equipped with a notation converting function according to a preferred embodiment of the invention.

The calculator comprises a key entry unit 1. The key entry unit 1 includes a numerical key 1a; a "DEC" key 1b, a "BIN" key 1c, an "OCT" key 1d, and a "HEX" key 1e functioning as a mode setting key and a notation converting key and a "←" key 1f and also a "→" key 1g functioning as a display moving key. Key entered data input from the key entry unit 1 are transferred to a control unit 2.

The control unit 2 is constructed of a ROM (read only memory) for previously storing a program to control various circuits of the electronic calculator. That is, the control unit 2 furnishes control instructions to a calculation memory unit 3, a mode memory 4, a calculating unit 5, a data reading unit 6, a flag memory 7, and a symbol display control unit 8.

In the calculation memory unit 3, there are provided an X register 32 and a B register 31 arranged by 32 bits. The numerical data input from the key entry unit 1 are written into the X register 32, whereas the binary-converted values are written into the B register 31. The mode memory 4 stores a mode of a notation in accordance with the mode key input from the key entry unit 1. The function of the calculating unit 5 is to notation-convert the content of the X register 32 of the calculation memory unit 3 based upon a notation mode stored in the mode memory 4.

The binary notation data which has been stored in the B register 31 of the calculation memory unit 3 is read out. The data reading unit 6 subdivides the binary notation data stored in the B register 31 into 4 data blocks each constructed of 8 bits data, and reads a portion of the data in a block unit, and then supplies the divided data via the display buffer 9 to the display unit 10. The data read operation at the data reading unit 6 is performed based upon the contents of the flag memory 7. The flag memory 7 is arranged by 4 bits, and a position of flag data represents which portion of the entire data is displayed. That is, "1" the flag data is stored at a position corresponding to each of four blocks 1 to 4, in the flag memory 7, and the binary data of one block among the entire data is designated based on the position of 1 in four bits. In FIG. 1, there is shown that the lowest bit represents an initialization condition of "1", and this "1" position is changed by operating the above-described "←" key 1f and "→" key 1g of the key entry unit 1.

The content of the flag memory 7 is also supplied to the symbol display control unit 8. The symbol display control unit 8 displays the symbol representative of each block on the display unit 10. This symbol display control has another function to display the symbol corresponding to the flag data stored in the flag memory 7 in such a manner that this symbol is distinguishable from other symbols on the display unit 10. The display unit 10 includes 12 digits each consisting of 5×8 dot display elements. When the binary digits are displayed, the 8-bit binary data, defined as one blocks, are displayed on the lower 8 digits of the display unit 10 and also rectangular symbols corresponding to the respective blocks are displayed on the upper 4 digits of the display unit 10 (will be discussed later).

OPERATION OF CALCULATOR

Figure 3:
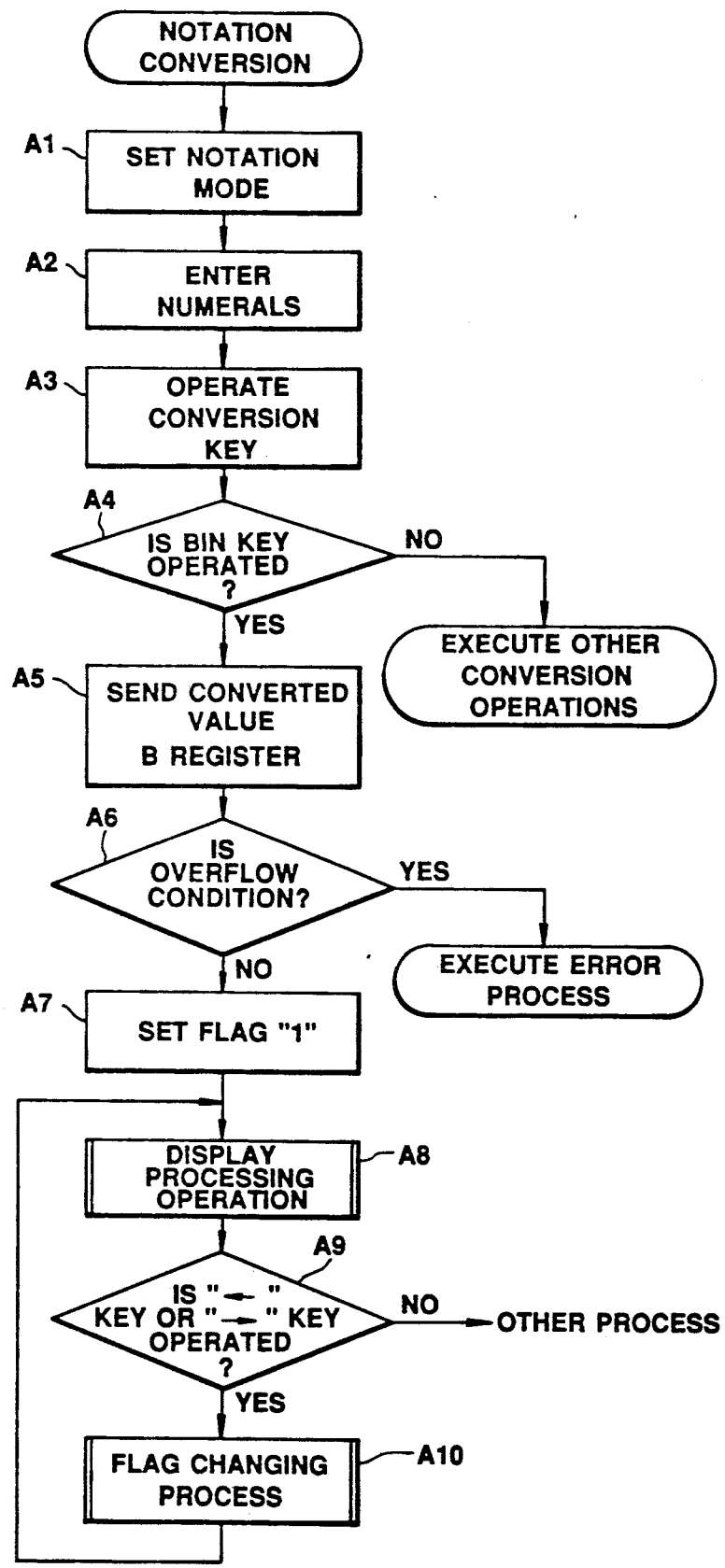
FIG. 3 is a flowchart for explaining an entire operation of the binary notation conversion.

When the electronic calculator is operated in the notation converting mode, the notation converting operation is executed in accordance with the operation defined in a flowchart shown in FIG. 3.

At a step A1, the notation mode is set and the numerical input is carried out in a next step A2. When, for instance, the "HEX" key 1e of the key entry unit 1 is operated as shown in FIG. 2A, the hexadecimal (sexidecimal) notation mode is set, and subsequently "7F51A" of the hexadecimal notation is entered as the numeral data by way of the numerical key 1a. As this key entry data, the hexadecimal notation mode is written via the control unit 2 into the mode memory 4, and the numeral "7F51A" is written into the X register 32 of the calculation memory unit 3, and displayed via the display buffer 9 on the display unit 10.

Thereafter, at a step A3, the conversion key is manipulated. At this time, if the binary notation conversion is instructed by operating the "BIN" key 1c of the key entry unit 1, as shown in FIG. 2B, a judgement result at a step A4 is YES. Then, the process is advanced to a step A5. To the contrary, if the "DEC" key 1b, or "OCT" key 1d other than the "BIN" key 1c is operated at the step A4, a judgement result is NO. Accordingly, other conversion processes are executed and the results thereof are displayed on the display unit 10. In this case, a length of the calculation result is not so longer than that of the binary notation.

In a step A5, the numerical data which has been stored in the X register 32 of the calculation memory unit 3 is supplied to the calculating unit 5, so that the binary notation conversion is carried out. The conversion result are "0000 0000 0000 0111 1111 0101 0001 1010" in the preferred embodiment. This converted value is furnished to the B register 31 (32 bits). In a subsequent step A6, a check is made whether or not the writing condition to the B register 31 overflows from the B register 31. If YES, then an error process is performed. Conversely, if NO, the process is advanced to the next step A7. In this step A7, "1" is written into the most lowest bit (i.e., a first bit) of the flag memory 7 as the initial condition so as to set the flag 1. The process is adviced to a subsequent step A8, in which the display process is performed in accordance with the flag memory 7.

Display Processing

Figure 4:
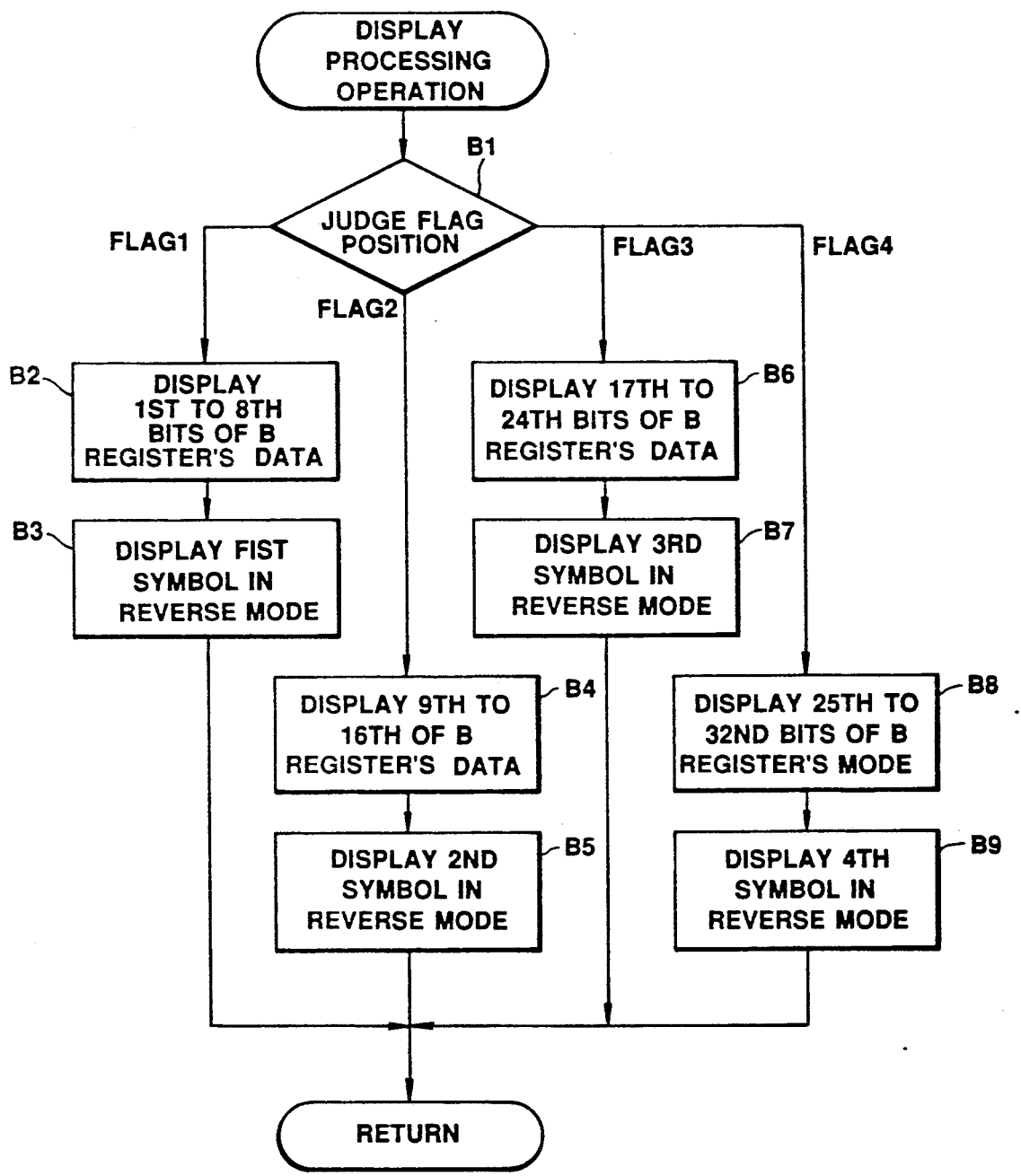
FIG. 4 is a flowchart for explaining a display process.

A detailed display processing operation is shown in a flowchart of FIG. 4.

At a step B1 defined in the flowchart shown in FIG. 4, a judgement is made on the flag position of the flag memory 7. Since the flag 1 has been set in the flag memory 7, the process is advanced to a next step B2. In this step B2, the first binary data to the length binary data (i.e., first block) of the B register 31 are read from the data reading unit 6, and thereafter transferred to the display buffer 9 for the display purpose. Then, in a step B3, four rectangular symbols indicative of the data block are displayed at the upper four digits of the display unit 10, and also the first symbol is displayed in the reverse mode thereof in accordance with the content of the flag memory 7. This display condition is illustrated in FIG. 2B.

When the display processing operation is accomplished, the process is advanced to a step A9, at which a judgement is made whether or not the "←" key or "→" key 1g is operated. If NO, then the process is advanced to other processing operations. However, if YES, the process is advanced to a next step A10, where a flag changing process of the flag memory 7 is executed.

Flag Changing Process

Referring now to a flowchart of FIG. 5, the flag changing process of the flag memory 7 will be described in detailed.

Figure 5:
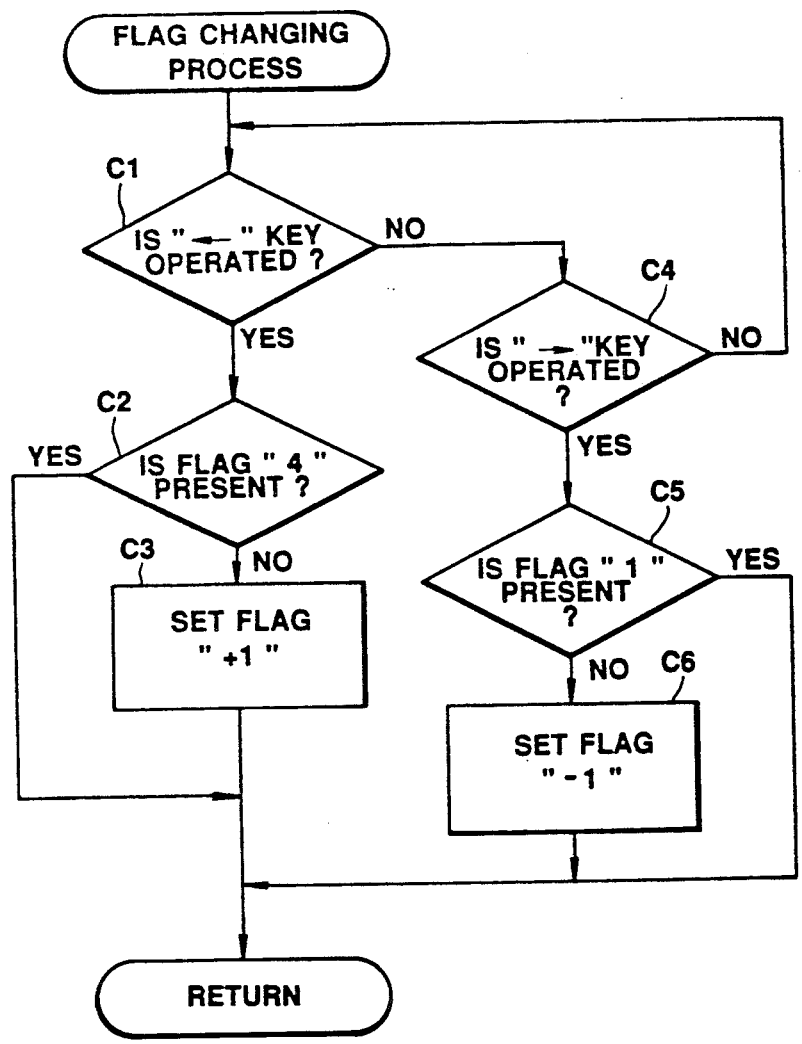
FIG. 5 is a flowchart for explaining a flag changing process.

In the flowchart of FIG. 5, when the "←" key 1f is operated, a judgement result becomes YES at a step C1. Then, net judgement is made whether or not "1" is present in the fourth bit of the flag memory 7 at a step C2. As the flag 1 has been set at this stage, the judgement result becomes NO. Thereafter, the process is advanced to a step C3. At this step C3, the flag 1 is erased, "+1" is newly added, and "1" is written into the second bit.

When the above-described flag changing process is accomplished, the process is returned to the previous step A8 as shown in FIG. 3, at which the display process is newly executed.

In this case, since the flag 2 is judged at the step B1, the process is advanced to a step B4, as represented in FIG. 4, where the binary data corresponding to the ninth to sixteenth bits are derived from the B register 31 and displayed on the display unit 10. In the subsequent step B5, to represent that the newly displayed data corresponds to the second block, the second symbol is displayed in the reverse display mode thereof. This display condition is shown in FIG. 2C.

Under this condition, when "←" key 1f is furthermore operated, the 17th to 24th bits of the binary data as the third block are displayed on the display unit 10. IN addition, when the "←" key 1f is operated, the 25th to 32nd bits of the binary data as the fourth block are displayed on the display unit 10. If "←" key 1f is furthermore operated, the flag is not moved because a judgement is made in the step C2 of the flowchart shown in FIG. 5 that the flag 4 is set. As a result, the fourth block display is maintained.

When, on the other hand, "→" key 1g is operated, the process is advanced from the step C4 to a next step C5 at which a judgement is made whether or not a flag 1 is present. In case that the flag "1" has been set, namely the first block is displayed, a process defined at a step C6 is not performed since no data is present in a lower digit.

In case that either second, third or fourth block is displayed, since the flag 1 is not set, the following operation is executed. That is, after the set flag is returned to "0" at a step C6, "1" is set to the bit lower than the present bit by 1 bit, whereby the binary data of the block lower than the present block by 1 block are displayed.

While has been described in above, in the electronic calculator according to the invention, the binary data corresponding to one of the subdivided blocks are displayed and simultaneously the symbol is displayed so as to indicate which block is now displayed in case that the binary converted values are displayed on the display unit thereof.

Furthermore, the contents of the upper block or lower block can be successively displayed by operating the "←" key 1f, or "→" key 1g. The position of the symbol displayed in the reverse mode can clearly indicate which portion of the entire binary data, the displayed data correspond to.

Although the binary data were subdivided into four blocks in the above-described preferred embodiment, the number of the data subdivision may be properly determined by a digit number of the display unit. Similarly, a bit number of a single block may be set dependent upon such a condition that a user can readily recognize the displayed data.

In the preferred embodiment, after the flag of the flag memory had been erased, the newly set data were entered. The present invention is not limited thereto. For instance, the flag memory may be arranged by a shift register, and the flag may be sequentially shifted by the "←" key and "→" key.

What is claimed is:

1. An electronic calculator, comprising:
    storing means for storing binary notation data therein;
    subdividing means for subdividing said binary notation data stored in said storing means into a plurality of groups, each group having the same bit number;
    data reading means for reading out one of said subdivided groups from said storing means;
    display means including a display member comprising a plurality of digits, capable of displaying the binary notation data of a subdivided group read by said data reading means; and
    indicating means for indicating which portion of said binary notation data stored in said storing means is displayed, said indicating means including symbol display means for displaying symbols representative of said subdivided groups, the number of which symbols being equal to that of said subdivided groups; and means for displaying that the symbol corresponding to one read group is distinguishable from other symbols.

2. The electronic calculator of claim 1, further comprising:
    changing means coupled to said data reading means for changing a designation of the group which is read by said data reading means.

3. The electronic calculator of claim 2, wherein:
    said storing means includes means for storing 32-bit binary notation data;
    said subdividing means includes means for subdividing said 32-bit binary notation data into four groups, each group having 8 bits;
    said display means includes a display member having at least a 12 digit display element for displaying one group as the binary notation which is read by 8 digits; and
    said symbol display means includes means for displaying the symbols on the remaining digits of said display means.

4. The electronic calculator of claim 3, wherein display element of said display means includes a dot-matrix type display element, and said symbol display means indicates the symbol in a rectangular shape.

5. The electronic calculator of claim 2, wherein:
    said data reading means further includes a flag memory having a memory capacity corresponding to the number of the subdivision;
    a position of a flag determines the read group; and
    said changing means includes means for changing the position of the flag.

6. The electronic calculator of claim 5, wherein said changing means includes key entry means for moving the group designations.

7. The electronic calculator of claim 1 further comprising:
    key entry means having numerical keys and keys for designating a notation conversion;
    calculating means for calculating at least binary notation conversion in response to a key entry by said key entry means; and
    means for storing the converted binary notation data into said storing means.

8. An electronic calculator, comprising:
    storing means for storing binary notation data therein;
    data reading means for reading out a portion of said binary notation data from said storing means;
    display means including a display member comprising a plurality of digits, capable of displaying the binary notation data read by said data reading means;
    indicating means responsive to said data reading means for indicating which portion of said binary notation data stored in said storing means is displayed;
    key entry means having numerical keys and keys for designating a notation conversion;
    calculating means for calculating at least binary notation conversion in response to a key entry by said key entry means; and
    means for storing the converted binary notation data into said storing means.

* * * * *